United States Patent [19]

Michos

[11] Patent Number: 5,856,429
[45] Date of Patent: Jan. 5, 1999

[54] POLYAMIDE COMPOSITIONS FOR REMOVAL OF POLYPHENOLS FROM LIQUIDS

[75] Inventor: Demetrius Michos, Columbia, Md.

[73] Assignee: W. R. Grace & Co.-Conn., New York, N.Y.

[21] Appl. No.: 833,613

[22] Filed: Apr. 8, 1997

Related U.S. Application Data

[63] Continuation-in-part of Ser. No. 672,860, Jun. 28, 1996, Pat. No. 5,628,910.

[51] Int. Cl.$^6$ .............................. C08G 69/28; C08L 77/00
[52] U.S. Cl. ........................ 528/332; 528/310; 528/335; 528/336; 528/341; 528/342; 528/347; 528/350; 525/446; 524/99; 524/100; 524/600; 524/607
[58] Field of Search ..................................... 528/310, 335, 528/336, 350, 342, 347, 332, 341; 525/446; 524/600, 607, 99, 100

[56] References Cited

U.S. PATENT DOCUMENTS

| | | | |
|---|---|---|---|
| 2,641,543 | 6/1953 | Unger et al. | 210/692 |
| 2,872,321 | 2/1959 | Walles et al. | 426/422 |
| 3,053,664 | 9/1962 | Hall et al. | 426/422 |
| 3,061,439 | 10/1962 | Stone | 426/422 |
| 3,117,004 | 1/1964 | McFarlane | 426/422 |
| 3,259,606 | 7/1966 | Okada | 528/310 |
| 3,264,372 | 8/1966 | Deichert et al. | 260/872 |
| 3,711,293 | 1/1973 | Geiger et al. | 426/422 |
| 3,818,111 | 6/1974 | Hoover | 426/422 |
| 3,878,300 | 4/1975 | Milligan | 426/16 |
| 3,878,310 | 4/1975 | Field et al. | 426/422 |
| 3,903,316 | 9/1975 | Hoover | 426/423 |
| 3,940,498 | 2/1976 | Butterworth et al. | 426/423 |
| 3,958,023 | 5/1976 | Butterworth | 426/271 |
| 4,008,339 | 2/1977 | Matsuda et al. | 426/330.4 |
| 4,032,593 | 6/1977 | Samejima | 528/272 |
| 4,073,954 | 2/1978 | Mobius | 426/330.4 |
| 4,076,767 | 2/1978 | Samejima | 528/272 |
| 4,166,141 | 8/1979 | Westermann et al. | 426/330.3 |
| 4,178,438 | 12/1979 | Haase et al. | 536/30 |
| 4,182,844 | 1/1980 | Kuceski | 528/335 |
| 4,282,261 | 8/1981 | Greene | 426/330.5 |
| 4,282,346 | 8/1981 | Sharkey | 528/338 |
| 4,500,554 | 2/1985 | Weetall | 426/323 |
| 4,508,742 | 4/1985 | McLaughlin et al. | 426/330.4 |
| 4,515,821 | 5/1985 | Armstead et al. | 426/330.4 |
| 4,594,250 | 6/1986 | Lauthen-schlaeger | 426/257 |
| 4,631,193 | 12/1986 | Sobus | 426/330.4 |
| 4,636,394 | 1/1987 | Hsu | 426/330.4 |
| 4,684,530 | 8/1987 | Welsh et al. | 426/330.5 |
| 4,766,000 | 8/1988 | Berg | 426/330.4 |
| 4,880,650 | 11/1989 | Okamura et al. | 426/330.4 |
| 4,965,083 | 10/1990 | Norman et al. | 426/330.5 |
| 5,006,356 | 4/1991 | Munson | 426/330.4 |
| 5,009,906 | 4/1991 | Smith | 426/330.4 |
| 5,102,676 | 4/1992 | Aldcroft et al. | 426/423 |
| 5,141,611 | 8/1992 | Ford | 426/330.3 |
| 5,194,279 | 3/1993 | Okel | 426/330 |
| 5,232,724 | 8/1993 | Aldcroft et al. | 426/330.4 |
| 5,628,910 | 5/1997 | Michos | 210/692 |

FOREIGN PATENT DOCUMENTS

| | | |
|---|---|---|
| 0089846 | 3/1983 | European Pat. Off. . |
| 1333293 | 10/1973 | United Kingdom . |
| 8606589 | 5/1986 | WIPO . |
| 9506100 | 3/1995 | WIPO . |

*Primary Examiner*—P. Hampton-Hightower
*Attorney, Agent, or Firm*—Charles A. Cross

[57] ABSTRACT

Amide-containing polymers characterized by the presence of piperazine amide and/or substituted piperazine amide in the polymer chain are used as adsorbents to remove polyphenolic compounds from liquids. The compositions are especially useful in combination with protein removal agents such as silica gel or tannin. The amide-containing polymer compositions (alone or in combination with protein removal agents) are especially useful in the stabilization and/or chillproofing of plant derived liquids or beverages such as beer, wine, fruit juice and vegetable juice.

15 Claims, No Drawings

POLYAMIDE COMPOSITIONS FOR REMOVAL OF POLYPHENOLS FROM LIQUIDS

This application is a continuation-in-part of application Ser. No. 08/672,860, filed Jun. 28, 1996 now U.S. Pat. No. 5,628,910.

BACKGROUND OF THE INVENTION

It is well known that many liquids such as beverages derived from grains/fruits/vegetables may contain certain polyphenols and proteins which create problems when beverages are mass produced. Specifically, these compounds may cause degradation of flavor and/or appearance for such beverages where they are stored for prolonged periods of time, subjected to variations in temperature, etc. The problem of removing adverse components is made more difficult by the fact that the adverse components are chemically similar to components which are desired in the beverage.

The removal of these adverse components from beverages prior to packaging for sale has been addressed by treating the beverages with various materials designed to adsorb one or more of the adverse components from the beverage. Due to the diverse nature of these adverse components, most treatments have involved contacting of the beverage with a combination of adsorbents, either simultaneously or sequentially. For removal of polyphenolics, certain polyamides have been used such as nylons and polyvinylpolypyrrolidone (PVPP). By far, PVPP has been the most widely used adsorbent for removal of polyphenolics and is considered to be significantly more effective than nylons. For removal of adverse proteins, the adsorbents such as silica gels and tannins have been used.

While PVPP is an effective polyphenol adsorbent, PVPP is an expensive material in the context of treating liquids on a commercial scale. This is especially true for the commercial production of beer and fruit juices. Due to its expense, most users of PVPP regenerate it after use by treatment with basic and acidic solutions. The regenerability of PVPP is limited. Also, the use of regenerated PVPP may result in the introduction of unwanted acid or base into the liquid to be treated. PVPP has further disadvantages in that it is affected by the presence of yeast. Thus, PVPP can be added to the processing of a beverage only after the yeast has been substantially removed. Thus, there is a need for alternative polyphenol adsorbents which provide the adsorption performance of PVPP without its disadvantages.

SUMMARY OF THE INVENTION

The invention provides alternative polyphenol adsorbents for use in treating polyphenol-containing liquids. These alternative adsorbents are amide-containing polymers characterized by the presence of piperazine amide units in the polymer chain.

In one aspect, the invention encompasses a method of treating a liquid containing polyphenolic compounds to remove some or all of the polyphenolic compounds from said liquid, the method comprising:

(a) contacting the liquid with a polymer wherein at least a portion of the polymer chain comprises piperazine amide units whereby at least a portion of the polyphenolic compounds is adsorbed by the amide-containing polymer, and (b) separating said amide-containing polymer with the adsorbed polyphenolic compounds from the liquid.

In another aspect, the invention encompasses a method of treating a liquid containing polyphenolic compounds and proteins to remove some or all of the polyphenolic compounds and proteins from said liquid, the method comprising:

(a) contacting the liquid with a polymer wherein at least a portion of the polymer chain comprises piperazine amide units whereby at least a portion of the polyphenolic compounds is adsorbed by the amide-containing polymer, (b) separating the amide-containing polymer with the adsorbed polyphenolic compounds from the liquid, (i) contacting the liquid with a protein adsorbent whereby at least a portion of the proteins are adsorbed by the protein adsorbent, and (ii) separating said adsorbed protein from said liquid. Steps (a) and (i) may be performed simultaneously or sequentially. Preferably, a protein-adsorbing silica is used in step (i).

The amide-containing polymer preferably contains piperazine $C_2$–$C_{12}$ carboxylamides. The amide-containing polymer may contain additional chain constituents such as aliphatic or alicyclic diamines (as diamides).

DETAILED DESCRIPTION OF THE INVENTION

The invention encompasses the discovery that amide-containing polymers which contain piperazine amide are especially useful for removing undesired polyphenolic compounds from liquids, especially beverages (e.g., beer, wine or juice) derived from plant matter (e.g., grains, fruits or vegetables). These polymers are useful in the stabilization and/or chillproofing of such beverages. For such purposes, the piperazine amide-containing polymers may be used alone or in combination with a conventional beverage treatment agent, especially a protein removal agent such as silica gel.

The polyphenol-adsorbing polymers of the invention are characterized by the presence in the polymer chain of a piperazine amide component:

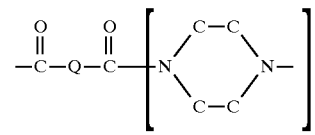

where Q can be any constituent corresponding to the body of the polycarboxylic compound used to form the amide. The piperazine (represented in brackets above) of the piperazine amide component is preferably ordinary piperazine, however, N-substituted piperazines such as 1-(2-aminoethyl) piperazine (AEP) or other substituted piperazines such as $C_1$–$C_6$ dialkyl piperazine may also be used to provide the piperazine amide component. In using such alternative piperazines, it is preferred that the formation of water-soluble polyamides is avoided. Thus, ordinary piperazine is preferably not completely replaced with AEP.

The acyl portion of the piperazine amide component is preferably derived from a dicarboxylic compound such as a dicarboxylic acid or dicarboxylic acid ester or other dicarboxylic compound. Preferred dicarboxylic compounds are aliphatic $C_2$–$C_{12}$ dicarboxylic compounds and compounds based on fatty acid dimers. Preferred aliphatic dicarboxylic compounds are:

where R and R' can be OH, OR", or a halogen; n=0–10, and R" is any ester group wherein the compound would react with the piperazine to release R and R'. Of these compounds, adipoyl and succinyl compounds are most preferred. Other polycarboxylic compounds may be substituted for the dicarboxylic compound. Examples of suitable di- and polycarboxylic compounds are disclosed in U.S. Pat. No. 4,182,844 and British Patent 1,496,508, the disclosures of which are incorporated herein by reference. If desired, mixtures of different polycarboxylic compounds may be employed.

The polyphenol-adsorbing polymers of the invention may further contain other components to modify and improve the performance of the resulting polymer. For example, a portion of the piperazine component may be replaced with another polyamine component such as aliphatic polyamines (e.g., triethylenetetramine, hexamethylenediamine, 2,2-dimethyl-1,3-propanediamine, N-methyl-1,3-propanediamine) and alicyclic polyamines (e.g., 1,4-diaminocyclohexane). Other suitable polyamines are disclosed in U.S. Pat. No. 4,182,844 and German Patent 43 28 254, the disclosures of which are incorporated herein by reference. Where such other polyamine is present, the mole ratio of piperazine to all other polyamines (total) is preferably about 5–95:95–5. More preferably, the total of other polyamines is present at about 5–25 mole percent of the combination of piperazine and such other polyamines.

The proportions of the piperazine, polycarboxylic acid, and alternative polyamine may be varied to some extent. On an equivalents basis, the amide-containing polymers of the invention preferably contain approximately equal amounts of (a) piperazine+alternative polyamine and (b) polycarboxylic acid.

The amide-containing polymers of the invention preferably not water soluble. The polymer particles preferably have a particle size of about 0.1–300 $\mu$m, more preferably about 0.5–200 $\mu$m, and a surface area of about 0.1–50 $m^2/g$.

If desired, the amide-containing polymers of the invention may be supported on support particles or a support substrate. For example, the amide-containing polymers of the invention may be supported on inorganic oxide particles such as siliceous oxides, especially amorphous silicas. In such instances, the supported composition preferably comprises at least about 10 wt. % (more preferably about 20–50 wt. %) of the amide-containing polymer based on the total weight of the amide-containing polymer and the support.

The amide-containing polyphenol adsorbents of the invention may be used alone or in combination with other adsorbents known to be useful for treating beverages. If desired, conventional polyphenol adsorbents such as nylon or PVPP may be used in combination with the amide-containing polyphenol adsorbents of the invention. Preferably, the amide-containing polyphenol adsorbents of the invention are used in combination with a protein adsorbent such as tannin or silica gel. Most preferably, the amide-containing polyphenol adsorbent is used in combination with a silica gel such as Daraclar® 7500 (sold by W. R. Grace & Co.). Conventional tannins such as Brewtan® (Omnichem N.V.) may be used to adsorb proteins. Silica gels (xerogels or hydrogels) are preferred especially because of their relative ease of use compared to tannins. Where tannin is used, it is preferred that the tannin and the polyphenol adsorbent of the invention are not present simultaneously in the beverage to be treated.

The amide-containing polyphenol adsorbents of the invention may be used to treat various liquids where polyphenol removal is desired, however, the amide-containing polyphenol adsorbents of the invention are especially useful for the removal of polyphenols from plant-derived beverages such as juices and fermented beverages (e.g., beer, wine, etc.). In plant derived beverages, the amide-containing polyphenol adsorbents, when used alone or in combination with a protein adsorbent, provide excellent stabilization and/or chillproofing. The amide-containing polyphenol adsorbents of the invention may be used to treat beverages in a similar manner as PVPP and nylon are currently used in the art, however, the adsorbents of the invention are especially advantageous in that they may be added directly to yeast-containing beverages (i.e. prior to yeast removal). See for example the techniques described in U.S. Pat. Nos. 3,264,372; 4,073,954 and 4,008,339, the disclosures of which are incorporated herein by reference. The amide-containing polyphenol adsorbents of the invention are preferably used in an amount effective to achieve the desired degree of polyphenol removal. Typical dosages may be on the order of 1–150 g/h-L.

When a combination of the amide-containing polyphenol adsorbents of the invention and a protein adsorbent are used, the relative proportions of these may be varied to achieve the desired performance for the specific liquid or beverage used. The relative proportions may vary significantly even for treatment of beverages of the same general class (e.g. beers). Where the protein adsorbent is a siliceous material, the weight ratio of the siliceous adsorbent to the polyphenol adsorbent is preferably about 0.01–100:1, more preferably about 5–10:1. Where the polyphenol adsorbent is used in a supported form, the above ratios should be determined excluding the weight of the support (as part of the polyphenol adsorbent or as part of the siliceous adsorbent where the support is siliceous). The combination of polyphenol and protein adsorbents may be used sequentially (with removal of the one adsorbent before addition of the other) or simultaneously (except for tannin as noted above) wherein both adsorbents are added at the same time or where one is added while the other is present in the liquid to be treated. The polyphenol adsorbent and protein adsorbent may be used in any order.

The amide-containing polyphenol adsorbents of the invention may be synthesized by any known technique such as those described in U.S. Pat. No. 4,182,844, British Patent 1,496,508 and German Patent 43 28 254. In one method (interfacial polymerization), the piperazine component and a base such as sodium hydroxide or sodium carbonate are dissolved in water. A solution of dicarboxyl chloride (e.g. succinyl chloride) in methylene chloride is then added rapidly (in less than one minute) to the piperazine solution using strong agitation (e.g. a blender). Agitation is then maintained for an additional 5–20 minutes. The resulting slurry is then dried at about 40°–50° C. and washed (to remove chloride by-products of the polymerization) with deionized water until a neutral pH is reached. Where alternative polyamines are used in combination with the piperazine component, the alternative polyamine is preferably dissolved in the piperazine solution.

Where the amide-containing polymer is to be made in a supported form, the above mentioned components are preferably first combined and the resulting solution is impregnated onto the desired support. The impregnated support is then heated (preferably to about to 100°–250° C.) for sufficient time preferably about 1–3 hours) to facilitate the formation of the amide-containing polymer. The resulting supported amide-containing polymer is then preferably washed with water to remove any remaining reactants or reaction products. The material is then preferably dried in air before use.

The invention is further illustrated by the following examples. The invention is not limited to the specific details of the examples.

EXAMPLE 1

Preparation of Poly(piperazine succinamide) ("P4") and Poly(piperazine adipamide) ("P6")

5.0 g piperazine and 12.31 g sodium carbonate were dissolved in 100 ml deionized water. The solution was then poured into a blender. 9.0 g succinyl chloride was dissolved in 20 ml $CH_2Cl_2$. 10 ml $CH_2Cl_2$ was added to the piperazine solution in the blender and the blender was turned on. The succinyl chloride solution was then added to the blender in less than one minute. The blender agitation was continued for 10 more minutes. The resulting slurry was then dried at 45° C. and repeatedly washed with deionized water until the pH of the resulting wash water was neutral. The washed polymer was then dried again at 45° C. to produce the desired P4 material.

The P6 material was prepared in a similar manner except that 10.62 g adipoyl chloride was substituted for the succinyl chloride.

EXAMPLE 2

Polyphenol adsorption

To determine the polyphenol adsorption capacities of P4 and P6, each material was used to treat beer A after maturation. PVPP was used as a comparison. The results are shown in Table 1 where the amount of polyphenols was measured using ASBC method: Beer-35.

TABLE 1

| Material | Dose (g/hL) | Reduction in polyphenols (ppm) |
|---|---|---|
| PVPP | 30 | 66 |
| P4 | 30 | 71 |
| P6 | 30 | 62 |

EXAMPLE 3

Chillproofing

The chillproofing performance of the P4 and P6 materials of example 1 was tested using neat samples of the materials as well as combinations thereof with a silica gel protein adsorbent (Daraclar® 7500). Samples of the silica gel were also tested alone for comparison. The samples were contacted with a chip beer A at the dosages described in Table 2. All samples were filtered through a diatomaceous earth coated filter, carbonated, bottled and pasteurized. The samples were then held at 38° C. for 6 days and then for two days at 2° C. The level of chill haze was measured in nephelometer turbidity units (NTU).

TABLE 2

| Material | Dose (g/hL) | Haze (NTU) |
|---|---|---|
| Silica Gel | 60 | 6 |
| Silica Gel | 40 | 10 |
| P4 | 30 | 1 |
| P6 | 30 | 21 |
| P6 + Silica Gel | 10 + 30 | 8 |
| P4 + Silica Gel | 10 + 30 | 2 |
| P4 + Silica Gel | 20 + 20 | 1 |

EXAMPLE 4

Preparation of triethylenetetramine-modified poly (piperazine succinamide)

2.68 g piperazine and 0.24 g triethylenetetramine (TET) were dissolved in 100 ml deionized water. 17.0 ml of 4N sodium hydroxide solution was added to the piperazine solution. The resulting solution was poured into a blender. 5.0 g succinyl chloride was dissolved in 20 ml $CH_2Cl_2$. 10 ml $CH_2Cl_2$ was added to the piperazine solution in the blender and the blender was turned on. The succinyl chloride solution was then added to the blender in less than one minute. The blender agitation was continued for 10 more minutes. The resulting slurry was then dried at 45° C. and repeatedly washed with deionized water until the pH of the resulting wash water was neutral. The washed polymer was then dried again at 45° C. to produce the desired TET-modified P4 material.

The chillproofing performance of the TET-P4 material with a silica gel (Daraclar® 7500) was compared to a sample of the silica gel alone using a beer B. The results are indicated in Table 3.

TABLE 3

| Material | Dose (g/hL) | Haze (NTU) |
|---|---|---|
| Silica Gel | 60 | 8 |
| Silica Gel + TET-P4 | 36 + 4 | 1 |

TABLE 5

| Material | Dose (g/hL) | Haze (NTU) |
|---|---|---|
| Silica Gel + DAC-P6 | 36 + 4 | 4 |
| Silica Gel + PVPP | 36 + 8 | 10 |
| Silica Gel + PVPP | 36 + 12 | 8 |

EXAMPLE 5

Preparation of 1,4-diaminocyclohexane-modified poly (piperazine adipamide)

1.88 g piperazine and 1.25 g 1,4-diaminocyclohexane (DAC) were dissolved in 100 ml deionized water. 11.4 ml of 4N sodium hydroxide solution was added to the piperazine solution. The resulting solution was poured into a blender. 4.0 g adipoyl chloride was dissolved in 20 ml $CH_2Cl_2$. 10 ml $CH_2Cl_2$ was added to the piperazine solution in the blender and the blender was turned on. The succinyl chloride solution was then added to the blender in less than one minute. The blender agitation was continued for 10 more minutes. The resulting slurry was then dried at 45° C. and repeatedly washed with deionized water until the pH of the resulting wash water was neutral. The washed polymer was then dried again at 45° C. to produce the desired DAC-modified P6 material.

The chillproofing performance of the DAC-modified P6 material with a silica gel (Daraclar® 7500) was compared to a sample of the silica gel alone using a beer C. The results are indicated in Table 4.

A further chillproofing test was performed comparing the combination of DAC-P6 and silica gel with combinations of PVPP (Polyclar® from GAF Corp.) using beer D. The results are indicated in Table 5.

TABLE 4

| Material | Dose (g/hL) | Haze (NTU) |
| --- | --- | --- |
| Silica Gel | 80 | 6 |
| Silica Gel + DAC-P6 | 36 + 4 | 2 |

EXAMPLE 6

Preparation of supported triethylenetertramine-modified poly(piperazine succinamide)

2.772 g piperazine, 0.2476 g triethylenetetramine (TET), and 4.00 g succinic acid were combined with 11.7 ml water to form a solution. 7.71 g silica gel (9% TV) particles were then impregnated with the solution. The resulting material was then heated in a stream of nitrogen gas at 220° C. for about two hours. The material was then washed with water and air dried to achieve the supported triethylenetertramine-modified poly(piperazine succinamide) containing about 50 wt. % triethylenetertramine-modified poly(piperazine succinamide).

The chillproofing performance of the supported TET-P4 was similar to that of the material of Example 4 above.

What is claimed is:

1. A composition comprising inorganic oxide and amide-containing polymer wherein at least a portion of the amide comprises piperazine amide, substituted piperazine amide or combinations thereof.

2. The composition of claim 1 wherein said inorganic oxide is a siliceous oxide.

3. The composition of claim 2 wherein said composition comprises an admixture of (a) particles of said siliceous oxide and (b) particles of said polymer.

4. The composition of claim 2 wherein said composition comprises a particulate composite of said siliceous oxide and said polymer.

5. The polymer of claim 1 wherein the polymer comprises piperazine dicarboxylic amide, substituted piperazine dicarboxylic amide or a combination thereof.

6. The polymer of claim 5 wherein said piperazine dicarboxylic amide or substituted piperazine dicarboxylic amide comprise an aliphatic dicarboxylic component.

7. The polymer of claim 6 wherein said aliphatic dicarboxylic component is selected from the group consisting of $C_2$–$C_{12}$ dicarboxylic components.

8. The polymer of claim 5 wherein said piperazine dicarboxylic amide and substituted piperazine dicarboxylic amide are selected from the group consisting of piperazine succinamide, piperazine adipamide, substituted piperazine succinamide, substituted piperazine adipamide and mixtures thereof.

9. The polymer of claim 1 further comprising an additional amide component other than piperazine amide.

10. The polymer of claim 9 wherein said additional amide component is aliphatic amide.

11. The polymer of claim 10 wherein said aliphatic amide is derived from an aliphatic amine selected from the group consisting of triethylenetetramine, hexamethylenediamine, 2,2-dimethyl-1,3-propanediamine, N-methyl-1,3-propanediamine, and mixtures thereof.

12. The polymer of claim 9 wherein said additional amide component is alicyclic amide.

13. The polymer of claim 12 wherein said alicyclic amide is derived from 1,4-diaminocyclohexane.

14. The polymer of claim 1 wherein said amide-containing polymer comprises amide of 1-(2-aminoethyl)piperazine.

15. The composition of claim 2, wherein the siliceous oxide is impregnated with the amide-containing polymer.

* * * * *